United States Patent Office

Re. 27,736
Reissued Aug. 21, 1973

27,736

METHOD OF SHAPING THE END OF A PIPE OF THERMOPLASTIC MATERIAL INTO A BELL

Karl Muhlner, and Karl Jirka, Munich, and Johann Gutlhuber, Irlbach, Germany, assignors to Kunststoffwerk Gebruder Anger GmbH & Co., Munich, Germany Original No. 3,520,047, dated July 14, 1970, Ser. No. 568,508, July 29, 1966. Application for reissue Apr. 11, 1972, Ser. No. 243,094
Int. Cl. B23p *11/02, 17/00;* B29c *19/00*
U.S. Cl. 29—423 7 Claims

Matter enclosed in heavy brackets [ ] appears in the original patent but forms no part of this reissue specification; matter printed in italics indicates the additions made by reissue.

ABSTRACT OF THE DISCLOSURE

This disclosure relates to a mode of elastically deforming a thermoplastic pipe end to form an internal groove therein and assemble packing and supporting rings in the groove.

This invention relates to pipe connections for plastic pipes, particularly thermoplastic pipes, wherein the end of one pipe is insertable into the widened end of another pipe, the widened end constituting a sleeve carrying, in at least one inner ring groove, a rubber or elastically deformable packing ring whose inside diameter, until the other pipe is inserted, is smaller than the outside diameter of the pipe to be fitted therein. Such pipe connections are suitable for lines for drop-forming and gaseous liquids, there including pressure lines.

In known pipe connections of this kind, the packing ring, as a rule, completely hugs the inner wall of the ring groove when the pipe end is inserted. The force to be used for deforming the ring upon insertion of the pipe end to be inserted increases sharply with increasing deformation, so that relatively great forces may become necessary during installation. Another shortcoming of known constructions is that again and again the pipe end to be inserted pushes the ring out of its groove so that great care must be used in installation. Also the tension which the ring exerts upon its deforming of the furrow in the sleeve forming the groove and absorbing the tension will, if the dimensional deviations of the sleeve and pipe end to be inserted are unfavorable, often be undesirably high since the deforming force increases very greatly with the deformation.

The invention provides a pipe conectio which avoids the defects of known pipe connections and is particularly well suited for pipes of large diameter. The pipe connection according to the invention is characterized in that the ring groove, whose axial extent is much greater than its depth, presents two rounded inner shoulders, in which lie rounded edges of the packing ring which presents on its outer circumference a slightly arched circumferential trough which with the wall of the ring groove of the sleeve encloses an air space, while the inner side of the packing ring bulges inwardly to form an annular ridge. This definition of the form and position of the ring applies to the state in which the pipe end is not yet inserted in the sleeve.

With this design the insertion of the pipe end finds a much more slowly increasing insertion resistance than with a round profile of the ring, as the air space between circumferential trough and groove wall is compressible at will and exerts a flexible applying force also with the pipe end inserted. Another essential advantage resides in that due to the air cushion between packing ring and ring groove the pressure exerted on the ring groove is distributed evenly. Even at great tolerance-caused deviations of the diameter of the sleeve and pipe from the theoretical diameter, undesirably high tension peaks no longer occur in the annular furrow. Especially at great pipe dimensions, a relatively long deformation path is required because of the manufacturing tolerances connected therewith. For this reason, conventional packing elements are unsuitable, as they cause much higher deforming forces, so that satisfactory fitting together of the pipe connection elements may become impossible.

With the conventional packing rings, the compression of the ring against the sleeve and the inserted pipe end was furnished by the tendency of the elastic ring to return to its original form. In contradistinction, in the case of the invention, a great portion of the applying force is furnished by the compressed air cushion between the packing ring and groove wall.

The arching on the inside of the packing ring extends advantageously only over the central region of the inner circumferential surface thereof, whose free edges are rounded. This increases the deformability and facilitates the insertion of the pipe end.

In the case of small pipe diameters, the ring grooves and the packing rings therein are of relatively large dimensions so that thereby the packing rings are retained well in the grooves. In the case of larger pipe diameters, however, a difficulty arises inasmuch as the packing rings, which measured on the pipe diameter are relatively thin, tend to come out of the furrow or ring groove in the upper portion under the action of their deadweight, owing to which upon insertion of the pipe end into the sleeve the pipe end often damages the packing ring and pushes it out of its groove. This, of course, makes installation considerably more difficult. The packing ring can be glued into the furrow, but this is very complicated.

The present invention also eliminates these difficulties. It proceeds from the basic idea that one can improve the hold of the ring in the circumferential groove receiving it in the sleeve also by giving the circumferential groove and possibly also the ring a cross-section particularly favorable for the retention of the ring.

Accordingly, a preferred embodiment of the invention especially for large pipe diameters is characterized in that at least on one side of at least one packing ring there extends in the groove a fixed supporting ring applied by its outer surface against the groove wall and forming with one side wall an axial counter-bearing for the packing ring. This leaves completely free choice regarding the shape of this end wall, which can be given a form such that it retains the packing ring firmly in the ring groove.

Obviously the arrangement of one or more fixed supporting rings is not limited to the above described design of the packing ring. It can be used just as well for other forms of the packing ring, for example those with circular profile. However, the above explained packing ring form with the air-containing circumferential trough is preferred.

If only one supporting ring is provided, it is advantageously arranged on the side of the packing ring away from the sleeve opening as this counteracts an expulsion of the packing ring from the groove upon insertion of the pipe end. Preferably a fixed supporting ring is arranged on both sides of the packing ring.

A particularly good assurance against expulsion or falling out of the packing ring out of the groove receiving it is obtained in that at each fixed ring the side wall of at least one supporting ring forming an axial counter-bearing for the packing ring is brought forward toward the packing ring at its inner edge, so that this advanced edge engages under the packing ring.

Alternatively, the packing ring may be firmly connected with at least one supporting ring. The firm connection may be effected for example by molding the packing ring to the fixed ring or by molding the fixed ring to the packing ring.

Installation may be effected for example in that each fixed ring consists of two halves, of which first one and then the other is inserted in the interior of the sleeve. In this case the fixed ring must be split. Better, however, is a design where the ring is made of relatively hard elastic plastic and has a discontinuity only at one point. If such a ring has a greater diameter in the relaxed state than in the mounted state, and if the mass is so selected that the discontinuity of the ring is substantially closed when the ring is inserted in the groove, one obtains a good hold of the fixed rings.

Preferred, however, is a design where the fixed ring or rings are continuous. The installation of these rings will be explained later.

Advantageously each supporting ring has approximately the profile of a triangle whose longest side is formed by the cylindrical inner surface of the ring, whose shortest side is arched concavely and applies against the packing ring, and whose third side applies internally against the groove wall. Such a design permits giving the annular furrow of the pipe sleeve receiving the packing means a form particularly favorable with regard to strength. It is further particularly advantageous for the method of installation according to the invention, which will be explained later.

The fixed ring consists advantageously of plastic. Thermoplastic material is preferred. Best suited is a plastic of a softening temperature equal to or preferably somewhat higher than that used for the piper, as this favors the method of production explained later.

The selection of material is advantageously made so that the materials of the fixed rings and of the pipe have the same chemical and physical behavior.

The invention comprises also a method for the production of a pipe sleeve of thermoplastic material with fixed supporting rings in the ring groove.

This method is distinguished in that the continuous supporting ring or rings and possibly also one or more packing rings, or filling rings which can be removed again after formation of the sleeve, are placed on a substantially cylindrical core whose outside diameter is equal to the desired inside diameter of the sleeve, in that this core with the rings is inserted into the end of the pipe, widened or to be widened to form the sleeve and heated to the range of thermoelastic deformability, in that the sleeve end is consolidated over the core and over the rings by cooling, in that the core is pulled out of the sleeve end, and in that finally the filling ring or rings, if any, are removed from the sleeve. The supporting rings are now firmly seated in the annular furrow of the sleeve. A special advantage of this method resides in that with it at the same time the sleeve can be shaped to the pipe end. Due to the fact that the sleeve end, that is, the pipe end already widened or preferably still to be widened to form the sleeve, has been heated to the range of thermoelastic deformability, the pipe end rises beyond the rings during insertion of the core and contracts again elastically behind them to the diameter of the core. According to the principle of relativity in mechanics, of course, the sleeve end may alternatively be fitted over the core without thereby going outside the invention.

In the case of large pipe diameters it is advantageous if the sleeve is compressed from the outside before its reconsolidation. The clinging of the material to the core and the supporting rings is thereby favored. The method is conducted particularly favorably if this compression is brought about with the aid of the external air pressure by suction of air from the zone between the sleeve and core.

To avoid too rapid a consolidation of the sleeve end present in the thermoelastic temperature range upon insertion of the core, the latter is advantageously heated beforehand. A temperature of 50 deg. C. has proved suitable for polyvinyl chloride pipes.

The invention is next further explained with reference to the attached drawings showing examples of construction and in which.

Figure 1:
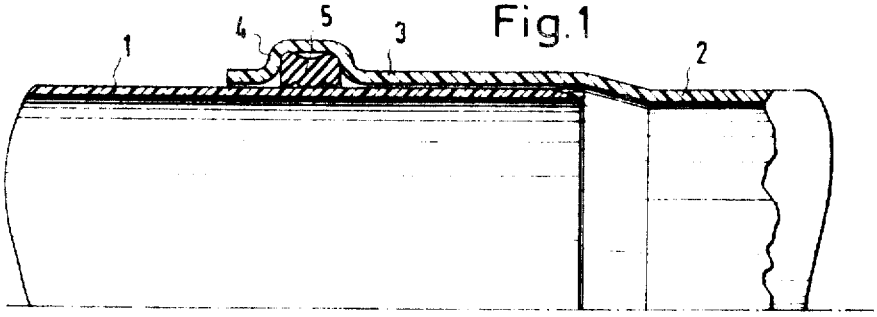
FIG. 1 shows in axial section a pipe connection according to the invention.
Figure 2:
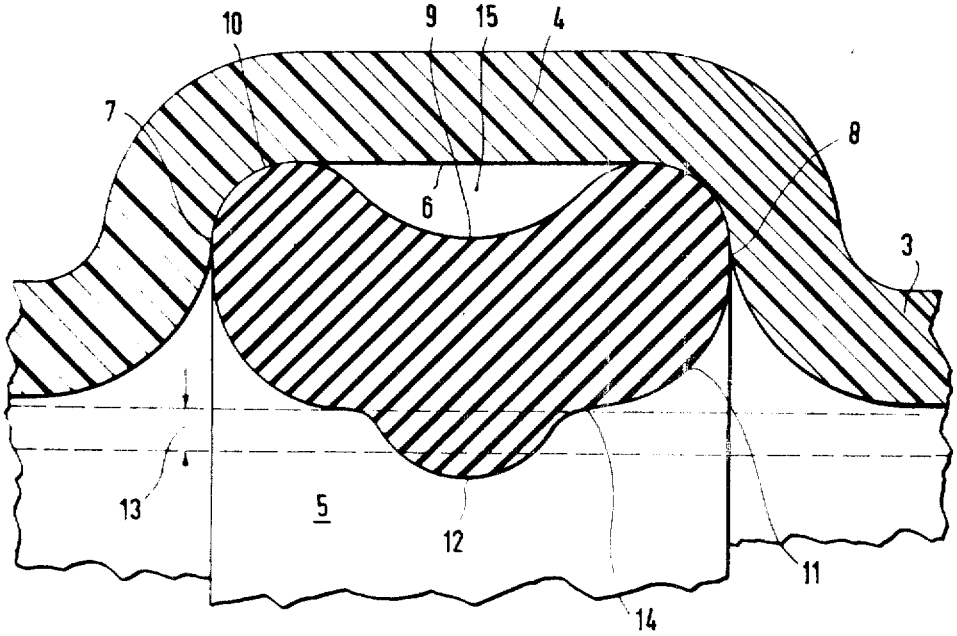
FIG. 2 shows on enlarged scale in axial section a portion of a packing ring placed in the annular furrow, according to the invention, where the pipe end to be inserted has not yet been inserted.
Figure 3:
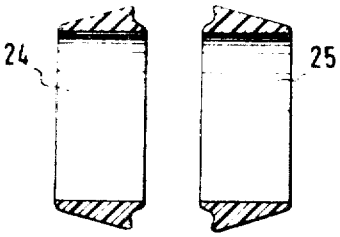
FIG. 3 shows on a different scale in axial section a pair of fixed supporting rings as they may be used according to the invention.

The pipe connection in FIGS. 1 and 2 between the extruded pipes 1 and 2 consisting of polyvinyl chloride has a sleeve 3 provided with an annular furrow 4. In the latter extends the elastic packing ring 5, made of natural or synthetic rubber, which by its internal ridge 12 applies sealingly against the inserted pipe end 1.

As can be seen from FIG. 2, the ring groove 6 formed by the annular furrow 4 has approximately the form of a trapezoid which closely approaches the form of a rectangle. The edges of the ring groove are rounded out. The depth of the ring groove is preferably one half of its axial extent.

Into the ring groove the packing ring 5 is placed. It is held there, even if at great pipe diameters its stiffness is not sufficient, by application against the lateral zones 7 and 8 of the ring groove, since its extent in axial direction in the relaxed state is slightly greater than the corresponding dimension of the ring groove. The outer circumferential surface of ring 5 is drawn in concavely, so that its profile is limited externally by a gentle arc line 9 which terminates in the rounded corners 10. Also on the inside, the corners 11 of the ring are rounded. At 12 the ring shows an arch, which projects inwardly beyond the innermost limit line of the tolerance field 13 for the outside diameter of the pipe end to be inserted. On both sides of the annular ridge 12, the inner surface of the ring extends slightly arched inwardly at 14.

If now the pipe end 1 is inserted, by its conically tapering end it pushes the annular ridge 12 outward, which then applies sealingly against the pipe end. Further the air chamber 15 is compressed between annular furrow and outer surface of the ring, so that a constant pressure can act on the entire outer ring groove surface.

The lateral ridges 11 of the ring are thereby pushed down and thus enlarged the contact surface of the ring, owing to which a lower pressure per area acts on the inserted pipe.

Below is explained the construction with fixed supporting rings for the packing ring.

Figure 5:
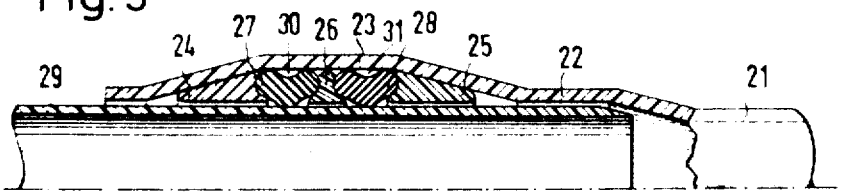
FIG. 5 shows in axial section the upper half of the preferred form of a pipe connection designed according to the invention, with two packing rings and three supporting rings.

In the construction shown in FIG. 5, the end of pipe 21 is designed as insertable sleeve 22. At 23 the sleeve presents an enlargement in which are seated the fixed supporting rings 24, 25 and 26 as well as the packing rings 27 and 28. The pipe is made of polyvinyl chloride, as are also the fixed rings 24, 25 and 26. The packing rings 27 and 28 are made of soft rubber. The connection is suitable for lines under pressure, both those under internal and those under external pressure.

As can be seen from the drawing, the fixed supporting rings 25 apply firmly against the wall of the enlargement 23 of the sleeve by reason of their oblique outer surfaces. The supporting rings 25 and 26 or respectively 24 and 26 each leave between them a ring groove 30, 31 of approximately trapezoidal cross-section. The cross-section of these ring grooves widens outwardly. Owing to this, the packing rings 27 and 28 find therein an excellent accommodation and it is avoided that upon insertion of the pointed end, they are pushed out of the grooves holding them. It is clear that the inside diameters of the fixed supporting rings 24, 25 and 26 are greater by a small amount taking into account the manufacturing tolerances than the outside diameter of the pipe 29 to be inserted. To avoid notch effects, the edges of the rings 24, 25 and 26 applying against the inner surface of the sleeve are rounded.

Figure 4:
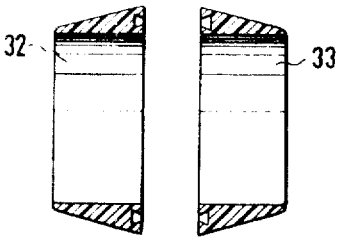
FIG. 4 shows in similar representation a different form on construction of a pair of supporting rings.

For the supporting rings 32 and 33 shown in FIG. 4, a groove of dovetail profile is provided for each in the sides facing each other. These rings are especially suited for being firmly connected with the rubber ring. For this purpose they are placed in the mold intended for the production of the rubber ring. When the rubber packing ring is then molded, the dovetail-shaped grooves fill up with rubber and a firm, positive connection results.

Figure 6:
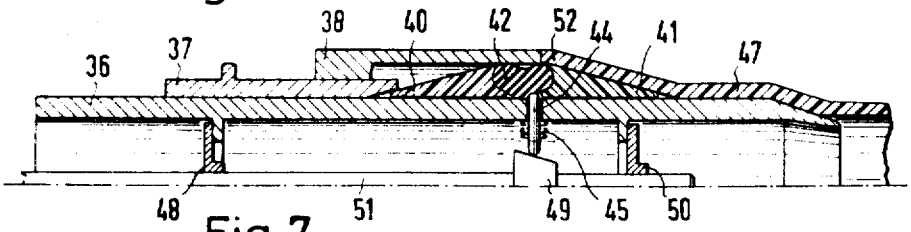
FIG. 6 shows in axial section the production of the preferred form of a sleeve end designed according to the invention, with only one packing ring and two supporting rings during the insertion of the core.
Figure 7:
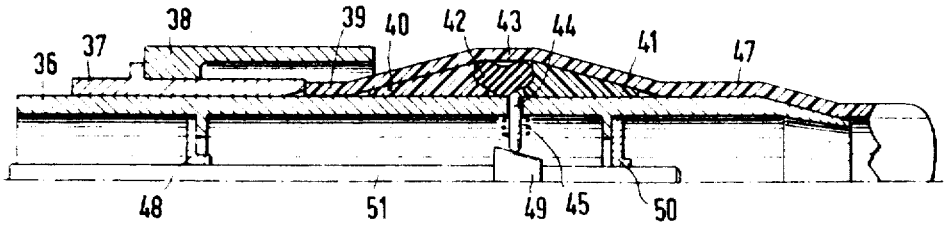
FIG. 7 shows the same construction after completed insertion of the core.
Figure 8:
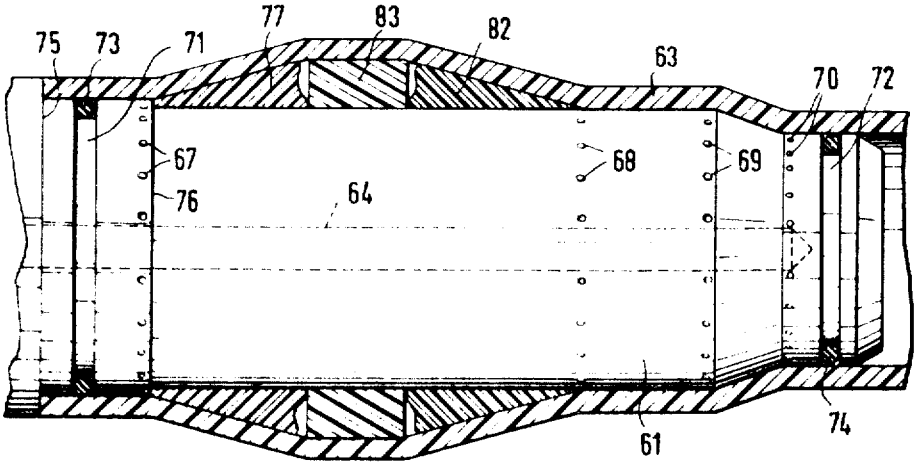
FIG. 8 shows on a different scale, from the side, the preferred form of a core for the production of a sleeve with supporting rings in the circumferential furrow after completed fitting of the pipe end onto the core.
Figure 9:
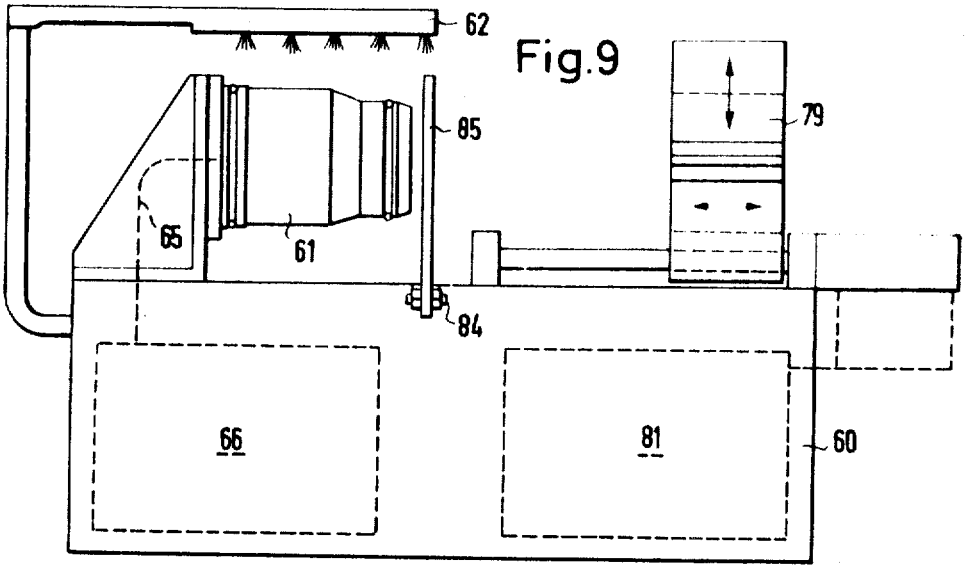
FIG. 9 shows diagrammatically on a different scale the whole arrangement for carying out the method according to the invention, from the side.
Figure 11:
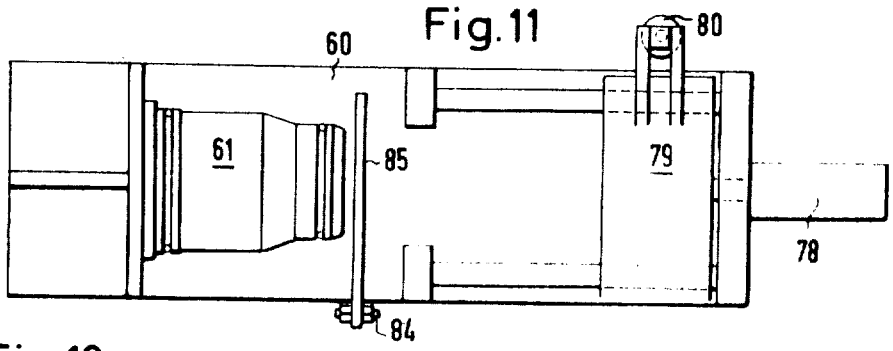
FIG. 11 shows the view from about of FIG. 9.
Figure 10:
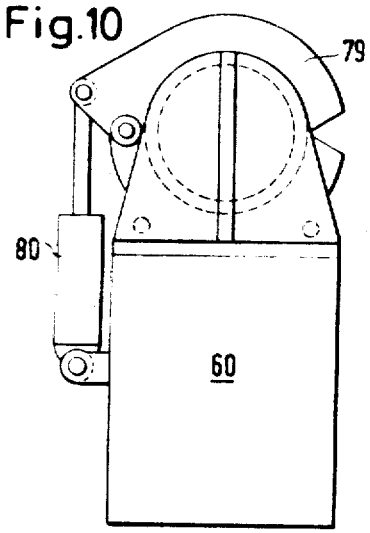
FIG. 10 shows the view from the left of FIG. 9.

The sleeve construction shown in FIGS. 6 and 7 represents the preferred form of a sleeve with only one packing ring. It differs from the construction according to FIG. 5 essentially in that one instead of two packing rings is provided. Accordingly the axial extent of the entire packing construction is much smaller than in the construction according to FIG. 5.

An embodiment of the method according to the invention for the production of the sleeve connection will now be further explained with reference to FIGS. 6 and 7, where the core 36 is shown in section in the upper half.

Core 36 consists mainly of a steel shell, whose external form corresponds essentially to the internal form of the pipe sleeve to be produced. Its right end tapers to facilitate the sliding on (FIG. 7) of the thermoplastic pipe end.

For holding the right-hand supporting ring 41, the core possesses some radially movable pins 44, which under the action of a spring 45 tend to move into the core far enough so as not to protrude beyond the circumferential surface of the core. These pins cooperate with a conical control piece 49 which is seated on the rod 51 which is guided axially in the bearing disks 48 and 50. If the rod is displaced by axial displacement to the right into the position shown in FIGS. 6 and 7, the pins 44 are pushed outward radially and thus form stops for the supporting ring 41. The core 36 has further mounted on it for axial displacement a bushing 37 which serves to secure the supporting ring 40 against being seized by the end 52 of the sleeve end 47 an dbeing displaced along the core. As the end of the supporting ring 40 at left in FIGS. 6 and 7 advantageously has sharp edges, as far as this is possible, to avoid the formation of dirt chambers, the contact area between bushing 37 and supporting ring 40 is conical, as indicated in the drawing.

On bushing 37 is mounted, also for axial displacement, a second bushing 38, whose function it is to retain the packing ring 42 before insertion thereof into the elastically deformable sleeve end 47 radially inward. During insertion into the sleeve end, the right end face of this ring is forced by the sleeve end 52 to slide on the bushing 37.

For carrying out the method according to the invention, with rod 51 shifted toward the left, so that the pins 44 are drawn into the interior of the core, the supporting ring 40 is first slid onto core 36, then the elastic rubber backing ring 42 and then the supporting ring 41. Meanwhile the bushings 37 and 38 are in the position shown in FIG. 6, where they are retained. The two supporting rings 40 and 41 may alternatively be made of a plastic softening at a higher temperature than that of the pipe. Next, the rod 51 is moved to the right, so that ring 41 is prevented from being displaced. Advantageously the supporting rings 40 and 41 as well as the packing ring 42 and the core 36 are treated externally with a lubricant before they are applied.

Next, the core is inserted into the sleeve end 52 which in the meantime has been brought into an elastically deformable state by softening. In so doing, this sleeve end is widened, as can be seen from FIG. 6. When the outermost edge 52 of the sleeve end has reached the position shown in FIG. 6, it pushes bushing 38 before it counter to the pressure of a weak spring power. When bushing 38 has reached the outer stop collar on bushing 37, it actuates a limit switch (not shown) which after a certain delay moves the bushings 37 and 38 to the left. In this state, the outermost left end 52 of the sleeve has already embraced the packing ring 42 and holds the latter clamped together in radial direction. Also, the end 52 has come far enough on the outer conical circumference of the supporting ring 40 that it no longer tends to push this ring before it, but retains it in its position due to the inclination of the circumferential surface of ring 40. The two bushings 37 and 38 are now dispensable and are therefore brought out of active position. This state of the two rings is illustrated in FIG. 7. An important point, of course, is that the right end face of this bushing still applies by a sufficiently large area against the left end face of the sleeve end when the two bushings 37 and 38 are retracted into the inactive position shown in FIG. 7. Next the core slides farther into the elastic sleeve end, to a portion which is adjacent that rising over the annular ridge formed on the rings and which is more constricted. It slides until the left end 52 of the sleeve end abuts on the right end of the bushing 37. If necessary, the produced furrow can be copied also from the outside. As a rule, however, this is not necessary.

Finally the sleeve is cooled and thereby consolidated. Next, after movement of rod 51 to the left and the drawin in the pins 44 brought about thereby, the core 36 can be pulled out of the finished sleeve.

The next operation can begin.

It is more advantageous and simple than with the apparatus illustrated in FIGS. 6 and 7 to carry out the method with the apparatus shown in FIGS. 8 to 11.

The apparatus carries on a base 60 a deforming core 61. Above core 61 is a sprinkling nozzle 62 for cooling and consolidating the pipe sleeve 63 shaped on core 61. Core 61 contains a central bore 64 which is connected through a line 65 to an air suction device 66. From bore 64, thin bores 67, 68, 69 and 70 extend radially to the zones of the surface of the core at which by the production of a vacuum a particularly good clinging of the deformable sleeve to the core is to be brought about. Core 61 possesses in ring grooves 71 and 72 so-called O-rings 73 and 74, which upon production of a vacuum between core 61 and sleeve 63 seal the zone between them from the outside. At its left end the core has a stop 75 for the thermoplastic pipe sleeve 63. Also a low step 65 is provided at the core circumference, against which the supporting ring 77 braces itself when the pipe is fitted onto the core. This step is very low. Its height is for example 1 mm.

In front of core 61, the base 60 carries, displaceable in axial direction of the core by means of a hydraulic cylinder 78, a collet 79 for clamping the pipe to be deformed. Collet 79 is opened and closed by means of a hydraulic cylinder 80. Base 60 contains a hydraulic unit 81 for the actuation of the hydraulic cylinders 78 and 80.

Figure 12:
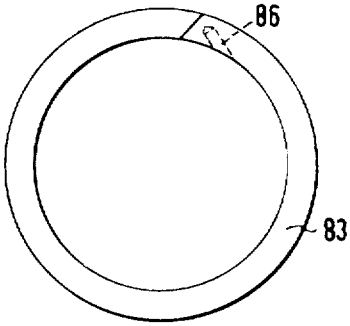
FIG. 12 shows on a different scale a filling ring.

To produce a pipe sleeve with supporting rings 77 and 82, first the core 61 is heated to about 50 deg. C. Then the closed supporting ring 77, an elastic but hard filling ring 83, which is slotted in the manner shown in FIG. 12, and the second supporting ring 82 are fitted on the core in the position shown in FIG. 8. Then the pipe, having been made elastically deformable in the end zone by heating to about 110 deg. C., is clamped into the collet 79 so that its end applies against the stop plate 85 pivotable about the axis 84. Plate 85 is then pivoted out of the path of movement of the pipe and the pipe is pushed by the hydraulic cylinder 78 over core 61 into the position shown in FIG. 8. Then the vacuum unit 66 is switched on, which by suction of air through lines 65, 64, 67, 69 and 70 causes the still deformable pipe end 63 to apply closely to the core also at the points where the sleeve of the pipe is pinched inward.

About ¼ to ½ minute later, the sprinkling nozzle 62 is switched on. This lets water run onto the finished pipe sleeve and thereby cools and consolidates the latter. Then, after switching off the vacuum unit 66 and the nozzle 62, the collet 79 with the pipe is taken away from the core 61. The pipe takes along parts 77, 83 and 82. Now the pipe is taken out of the collet 79. By means of a mandrel introduced in bore 86, the filling ring 83 is pulled inward under elastic deformation and removed from the interior of the sleeve. Into the opened ring groove, a packing ring, preferably of the kind shown in FIG. 2, is now placed under elastic deformation.

What is claimed is:

1. In a method for forming at the end of a pipe of thermoplastic material a widened sleeve having in an inner circumferential groove at least one packing ring and at least one additional ring constituting an axial counter-bearing for the packing ring, the steps of placing said at least one additional ring and said packing ring on a substantially cylindrical core whose outside diameter is equal to the desired inside diameter of the sleeve and heating the sleeve to the range of thermoelastic deformability, thereafter moving the core with the rings into said end of the pipe, by relative movement between the core and pipe, and allowing the part of said end of the pipe which has passed the rings to contract elastically, said end of the pipe being formed into said sleeve having in a resulting inner groove which constitutes the first said groove the packing and additional rings, thereafter consolidating the sleeve by cooling, and thereafter extracting the core from the sleeve, the rings remaining in the groove.

2. A method according to claim 1 wherein the sleeve is formed from the outside.

3. A method according to claim 1 wherein the sleeve is formed by internal suction between the sleeve and core.

4. In a method for forming at the end of a pipe of thermoplastic material a widened sleeve having in an inner circumferential groove at least one packing ring and at least one additional ring constituting an axial counter-bearing for the packing ring, the steps of placing *at least one* additional *ring* and *at least one* filling [rings] *ring* on a substantially cylindrical core whose outside diameter is equal to the desired inside diameter of the sleeve and heating the sleeve to the range of thermoelastic deformability, thereafter moving the core with the rings into said end of the pipe and allowing the part of said end of the pipe which has passed the rings to contract elastically, said end of the pipe being formed into a sleeve having in an inner groove [which constitutes the first said groove] the [packing] *filling* and additional rings, thereafter consolidating the sleeve by cooling, thereafter extracting the core from the sleeve, the rings remaining in the groove, and thereafter replacing [each] said filling ring with a packing ring.

5. A method according to claim 4 wherein the sleeve is formed from the outside.

6. A method according to claim 4 wherein the sleeve is formed by internal suction between the sleeve and core.

*7. A method according to claim 4 wherein two additional rings and one filling ring are placed on the core.*

References Cited

The following references, cited by the Examiner, are of record in the patented file of this patent or the original patent.

UNITED STATES PATENTS

| | | | |
|---|---|---|---|
| 2,766,806 | 10/1956 | Rothermel | 264—92 X |
| 3,265,410 | 8/1966 | Lorang | 285—231 X |

FOREIGN PATENTS

| | | | |
|---|---|---|---|
| 852,578 | 10/1960 | Great Britain | 264—249 |
| 1,172,418 | 6/1964 | Germany | 264—249 |

CHARLIE T. MOON, Primary Examiner

U.S. Cl. X.R.

29—450, 451; 264—92, 249; 277—1, 190; 285—231